Patented Dec. 30, 1930

1,786,527

UNITED STATES PATENT OFFICE

PHILIP H. GROGGINS, OF WASHINGTON, DISTRICT OF COLUMBIA

PROCESS FOR THE PREPARATION OF 2-HALOGEN-PARA-PHENYL-ORTHO-BENZOYL-BENZOIC ACID

No Drawing.   Application filed August 8, 1929.   Serial No. 384,507.

(GRANTED UNDER THE ACT OF MARCH 3, 1883, AS AMENDED APRIL 30, 1928; 370 O. G. 757)

This application is made under the act approved April 30, 1928, and the invention herein described, may be manufactured and used by and for the Government for governmental purposes without payment to me of any royalty thereon.

My invention relates to 2-halogen para-phenyl-ortho-benzoyl-benzoic acid and a process of making the same. It is the object of my invention to provide a simple economical method of rendering technically available either the intermediate aluminum base of 2-halogen-para-phenyl-ortho-benzoyl-benzoic acid or when desired the keto acid itself which is readily obtained from the aluminum base by hydrolysis.

I have found that 2-halogen-diphenyl can be condensed with phthalic anhydride in the presence of a suitable condensing agent such as anhydrous aluminum chloride or ferric chloride to give the aluminum or iron base of 2-halogen-para-phenyl-ortho-benzoyl-benzoic acid. I prefer to use anhydrous aluminum chloride for the reason that it provides the means of obtaining a smooth reaction, a product of high purity, and a yield not far from the theoretical. The reactions involved in the preparation of the intermediate anhydrous aluminum base, and the keto acid which is obtained upon hydrolysis of the aluminum compound are probably best expressed by the following two equations where hlg represents a halogen substituent such as chlorine or bromine:

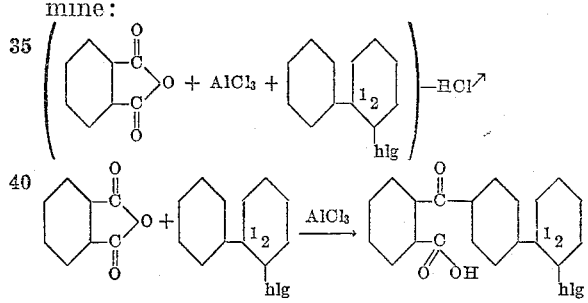

When 2-chloro-diphenyl is condensed in the above manner, the dull green anhydrous aluminum base of 2-chloro-para-phenyl-ortho-benzoyl-benzoic acid is obtained. Upon hydrolysis this yields 2-chloro-para-phenyl-ortho-benzoyl-benzoic acid, which is a white crystalline solid, practically insoluble in hot water. It is readily soluble in alcohol, chlorobenzene and glacial acetic acid. When the sodium or ammonium salts are made by treating with alkaline or ammoniacal solutions, these are readily soluble in cold water. Crude 2-chloro-para-phenyl-ortho-benzoyl-benzoic acid melts at 177°–183° C. When recrystallized from toluene or glacial acetic acid the melting point is 187°–187.5° C.

The preparation of the aluminum base of 2-halogen-para-phenyl-ortho-benzoyl-benzoic acid is best made using molecular proportions of phthalic anhydride and 2-halogen-diphenyl. As in the preparation of para-phenyl-ortho-benzoyl-benzoic acid described in my copending application Serial No. 384,505, dated August 8, 1929, it is not necessary to use inert solvents such as carbon disulfide or aromatic nitro-compounds to carry out the reaction.

Without limiting my invention to any particular procedure the following examples illustrate my preferred methods of preparation:

*Example I.*—One hundred forty-eight parts of phthalic anhydride, 188.5 parts of dry 2-chloro-diphenyl, and 293 parts of anhydrous aluminum chloride are put into a mill and thoroughly agitated for two hours. The hydrogen chloride which is liberated even at room temperature is drawn off by suitable connections. Heat is applied and the temperature kept from 40° C. to 120° C. until the evolution of hydrogen chloride is completed. The mixing of the ingredients is continued until the batch cools to room temperature and the aluminum base is obtained as an anhydrous dull green powder. To obtain 2-chloro-para-phenyl-ortho-benzoylbenzoic acid, the aluminum base is slowly added to 2000 cc of iced 10 per cent sulfuric acid under agitation. An almost colorless, crystalline, crude product is obtained.

*Example II*.—One hundred forty-eight parts of phthalic anhydride, 188.5 parts of 2-chloro-diphenyl, and 293 parts of anhydrous aluminum chloride are put into an agitated vessel. Five hundred parts of carbon disulfide are then slowly added. The reaction mass has a deep red color whereas with no solvents it is green. After warming on the steam bath until the evolution of hydrogen chloride has ceased, the carbon disulfide is removed and the remaining aluminum base of 2-chloro-para-phenyl-ortho-benzoyl-benzoic acid is obtained. This may be hydrolyzed to obtain the keto acid or may be used directly in the preparation of 2-chloro-beta-phenyl-anthraquinone.

*Example III*.—The preparation of 2-bromo-para-phenyl-ortho-benzoyl-benzoic acid may be carried out following the procedures in Examples I and II, except that molecular proportions of 2-bromo-diphenyl are employed in place of the corresponding chloro derivative.

I am aware that numerous changes may be made, and many details of the process varied through a wide range without departing from the principles of this invention, and I therefore do not purpose limiting the patent granted hereon, otherwise than necessitated by the prior art.

I claim as my invention—

1. A process for preparing 2-halogen derivatives of para-phenyl-ortho-benzoyl-benzoic acid which comprises condensing 2-halogen-diphenyl with phthalic anhydride.

2. A process for preparing the aluminum base of 2-halogen derivatives of para-phenyl-ortho-benzoyl-benzoic acid which comprises condensing 2-halogen-diphenyl with phthalic anhydride in the presence of aluminum chloride.

3. A process of preparing the aluminum base of 2-chloro-para-phenyl-ortho-benzoyl-benzoic acid which comprises condensing approximately molecular proportions of 2-chloro-diphenyl and phthalic anhydride in the presence of anhydrous aluminum chloride as a condensing agent.

4. A process of preparing 2-chloro-para-phenyl-ortho-benzoyl-benzoic acid which comprises condensing 2-chloro-diphenyl with phthalic anhydride in the presence of anhydrous aluminum chloride and then hydrolyzing the aluminum intermediate base that is obtained.

5. A process of preparing the aluminum base of 2-chloro-para-phenyl-ortho-benzoyl-benzoic acid which comprises condensing 2-chloro-diphenyl with phthalic anhydride in the presence of anhydrous aluminum chloride; the reaction taking place in the presence of an inert solvent.

6. As a new article of manufacture the aluminum base of 2-chloro-para-phenyl-ortho-benzoyl-benzoic acid having most probably the following formula:

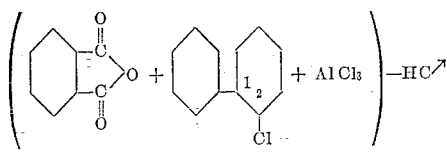

7. As a new article of manufacture 2-chloro-para-phenyl-ortho-benzoyl-benzoic acid having most probably the following chemical formula:

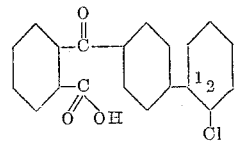

8. The process of preparing 2-chloro-para-phenyl-ortho-benzoyl-benzoic acid which comprises condensing 2-chloro-diphenyl with phthalic anhydride in the presence of aluminum chloride as a condensing agent, and heating the reaction mass to between 40°–120° C. until the evolution of hydrogen chloride is completed; and then hydrolyzing the anhydrous aluminum base.

In testimony whereof I have hereunto affixed my name.

PHILIP H. GROGGINS.